(12) United States Patent
Arora et al.

(10) Patent No.: US 12,298,949 B2
(45) Date of Patent: May 13, 2025

(54) SYSTEMS AND METHODS FOR DETECTING FALSE DATA ENTITIES USING MULTI-STAGE COMPUTATION

(71) Applicant: The Toronto-Dominion Bank, Toronto (CA)

(72) Inventors: Vidhi Arora, Stoney Creek (CA); Jennifer Bouchard, Montpellier (CA); Jorge Alberto Caicedo, Stouffville (CA); Yu Gu, Newmarket (CA); Hoi Sing Mak, Toronto (CA); Jennifer Dawn Miguez, Vaughan (CA); Kevin Shao, Saint-Hubert (CA); Andriy Shcherbatyuk, Ajax (CA); Tan Vu Vuong, Longueuil (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/464,814

(22) Filed: Sep. 11, 2023

(65) Prior Publication Data
US 2025/0086151 A1    Mar. 13, 2025

(51) Int. Cl.
G06F 16/215 (2019.01)
G06F 16/23 (2019.01)

(52) U.S. Cl.
CPC ........ *G06F 16/215* (2019.01); *G06F 16/2365* (2019.01)

(58) Field of Classification Search
CPC ... G06F 16/215; G06F 16/2365; H04W 12/02
See application file for complete search history.

(56) References Cited

U.S. PATENT DOCUMENTS

| | | | |
|---|---|---|---|
| 7,457,823 B2 | 11/2008 | Shraim | |
| 8,311,907 B2 | 11/2012 | Klein | |
| 8,554,719 B2 | 10/2013 | McGrew | |
| 8,639,629 B1 * | 1/2014 | Hoffman | G06Q 20/3821 705/64 |
| 8,768,838 B1 * | 7/2014 | Hoffman | G06Q 40/00 705/72 |
| 9,280,658 B2 | 3/2016 | Coggeshall | |
| 9,773,227 B2 | 9/2017 | Zoldi | |

(Continued)

FOREIGN PATENT DOCUMENTS

| | | |
|---|---|---|
| CN | 112200583 | 1/2021 |
| WO | 2017100795 | 6/2017 |

*Primary Examiner* — Jorge A Casanova
(74) *Attorney, Agent, or Firm* — Marks & Clerk; Paul Horbal; Wilfred P. So

(57) ABSTRACT

False data entities attempt to evade getting caught by changing their information repeatedly over time. Systems and methods are provided to detect false data entities. A computing system ingests a plurality of data files respectively from a plurality of external data sources using the network interface within a current specified time period. It consolidates a plurality of data entries of false data entities from the plurality of data files into a consolidated list for the current specified time period. It compares the consolidated list for the current specified time period with a previous consolidated list corresponding to a previous specified time period to identify one or more differences. It then updates a database, which comprises a current list of false data entities, with the one or more differences.

20 Claims, 8 Drawing Sheets

(56) References Cited

U.S. PATENT DOCUMENTS

| | | | |
|---|---|---|---|
| 10,178,067 B1* | 1/2019 | Kumar | H04L 67/51 |
| 10,346,903 B2 | 7/2019 | Bell | |
| 10,902,429 B2 | 1/2021 | Ebel | |
| 11,179,639 B1* | 11/2021 | Aghdaie | A63F 13/75 |
| 11,232,452 B2 | 1/2022 | Ivey | |
| 2016/0012445 A1* | 1/2016 | Villa-Real | G06Q 20/4016 |
| | | | 705/44 |
| 2017/0017887 A1 | 1/2017 | Waradkar | |
| 2017/0076292 A1 | 3/2017 | Schmitz | |
| 2019/0098039 A1* | 3/2019 | Gates | G16H 20/70 |
| 2019/0132740 A1* | 5/2019 | De | H04W 12/122 |
| 2020/0133955 A1* | 4/2020 | Padmanabhan | G06Q 30/01 |
| 2020/0258181 A1* | 8/2020 | Song | G06Q 30/0185 |
| 2021/0067544 A1 | 3/2021 | Taylor | |
| 2021/0125089 A1* | 4/2021 | Nickl | H04W 12/02 |
| 2022/0414074 A1* | 12/2022 | Daruna | G06N 20/00 |

* cited by examiner

SYSTEMS AND METHODS FOR DETECTING FALSE DATA ENTITIES USING MULTI-STAGE COMPUTATION

TECHNICAL FIELD

The disclosed exemplary embodiments relate to computer-implemented systems and methods for detecting false data entities and, in particular, to systems and methods that include processing and consolidating false data entities.

BACKGROUND

False data may be encountered across variety of different data systems. Different data systems may be able to track activity that introduces false data to a person or corporate entity, but in many cases, different data systems do not communicate this information with each other. Malicious actors, who may be the sources of false data, attempt to evade detection by changing their information repeatedly over time, in the process introducing more false data, such as by changing one or more of: address, name, phone number, and email address. These malicious actors may use stolen, real, or false aliases in the process.

Over time, certain entities may come to track millions of false data entities, such as phony aliases, in order to reduce risk of exposure to malicious activities This list grows daily.

In some cases, an interested party may wish to determine if a target entity they are interacting with is providing false data. In a conventional approach, the interested party separately accesses each of multiple different data systems to attempt to identify if the target entity is providing false data. This is time consuming and prone to error, since different data systems track different types of data, use different data structures, and have different naming conventions and schema.

SUMMARY

The following summary is intended to introduce the reader to various aspects of the detailed description, but not to define or delimit any invention.

In at least one broad aspect, there is provided a server system for detecting false data entities. The server system includes a memory, a network interface, and a processor, and the processor is operably coupled to the memory and the network interface. The processor configured to: ingest a plurality of data files respectively from a plurality of external data sources using the network interface within a current specified time period; consolidate a plurality of data entries of false data entities from the plurality of data files into a consolidated list for the current specified time period; compare the consolidated list for the current specified time period with a previous consolidated list corresponding to a previous specified time period to identify one or more differences; and, update a database, which comprises a current list of false data entities, with the one or more differences.

In some cases, a given one of the plurality sources provides at least two data files within the current specified period, and the processor is configured to pre-process raw data from the at least two data files to deduplicate one or more data entries common to the at least two data files.

In some cases, each of the plurality of data files respectively from the plurality of data sources comprise a unique primary key, and the unique primary key from each of the plurality of data files is represented in the consolidated list.

In some cases, the plurality of data files respectively has a plurality of different data structures, and the processor is further configured to process the plurality of data files to generate the plurality of data entries with a common data structure for consolidation in the consolidated list for the current specified time period, the common data structure including the unique primary key from each of the plurality of data files.

In some cases, the processor is configured to further: identify a set of different data entries, comprising a given data entry from each of the plurality of data files, with matching contact information of a given false data entity; and merge the set of different data entries into a single entry for the given false data entity in the consolidated list.

In some cases, the processor is configured to further provide a graphical user interface (GUI) that accesses the database, the GUI configured to display one or more of information values for a given false data entity, and the one or more information values comprising one or more of: a creation date, an end date, a name, a date of birth, a phone number, an email address, a data source associated with the entry, and a risk level.

In some cases, the processor is configured to further receive a user input via the GUI an addition or an edit the one or more information values for the given false data entity, and to propagate the addition or the edit to the current list of false data entities stored in the database.

In some cases, the processor is configured to further: ingest a data related to views of the consolidated list and, at least one of, a threat data and a contextual data; and process the data related to views on the consolidated list and, the at least one of the threat data and the contextual data to generate an analytics data; and wherein the data related to view comprises viewing data regarding one or more users viewing the consolidated list via the GUI.

In some cases, the processor is configured to further: process the analytics data to generate a screening data file; and store the screening data file in the database; and, wherein the GUI is configured to display a screening data entry from the screening data file.

In some cases, the processor is configured to further execute an ingestion process, a consolidation process, a comparison process, and an update process each day; and, wherein the current specified time period is today and the previous specified time period is yesterday.

In at least another broad aspect, a method is provided for detecting false data entities, the method executed in a computing environment comprising one or more processors and memory. The method includes: ingesting a plurality of data files respectively from a plurality of external data sources using a network interface within a current specified time period; consolidating a plurality of data entries of false data entities from the plurality of data files into a consolidated list for the current specified time period; comparing the consolidated list for the current specified time period with a previous consolidated list corresponding to a previous specified time period to identify one or more differences; and, updating a database, which comprises a current list of false data entities, with the one or more differences.

In some cases, a given one of the plurality sources provides at least two data files within the current specified period, and the processor is configured to pre-process raw data from the at least two data files to deduplicate one or more data entries common to the at least two data files.

In some cases, each of the plurality of data files respectively from the plurality of data sources comprise a unique primary key, and the unique primary key from each of the plurality of data files is represented in the consolidated list.

In some cases, the plurality of data files respectively have a plurality of different data structures, and the processor is further configured to process the plurality of data files to generate the plurality of data entries with a common data structure for consolidation in the consolidated list for the current specified time period, the common data structure including the unique primary key from each of the plurality of data files.

In some cases, the method further includes: identifying a set of different data entries, comprising a given data entry from each of the plurality of data files, with matching contact information of a given false data entity; and, merging the set of different data entries into a single entry for the given false data entity in the consolidated list.

In some cases, the method further includes providing a graphical user interface (GUI) that accesses the database, the GUI configured to display one or more of information values for a given false data entity, and the one or more information values comprising one or more of: a creation date, an end date, a name, a date of birth, a phone number, an email address, a data source associated with the entry, and a risk level.

In some cases, the method further includes receiving a user input via the GUI an addition or an edit the one or more information values for the given false data entity, and propagating the addition or the edit to the current list of false data entities stored in the database.

In some cases, the method further includes: ingesting a data related to views of the consolidated list and, at least one of, a threat data and a contextual data; and processing the data related to views on the consolidated list and, the at least one of the threat data and the contextual data to generate an analytics data; and wherein the data related to view comprises viewing data regarding one or more users viewing the consolidated list via the GUI.

In some cases, the method further includes executing the ingesting, the consolidating, the comparing, and the updating each day; and, wherein the current specified time period is today and the previous specified time period is yesterday.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

Figure 1A:
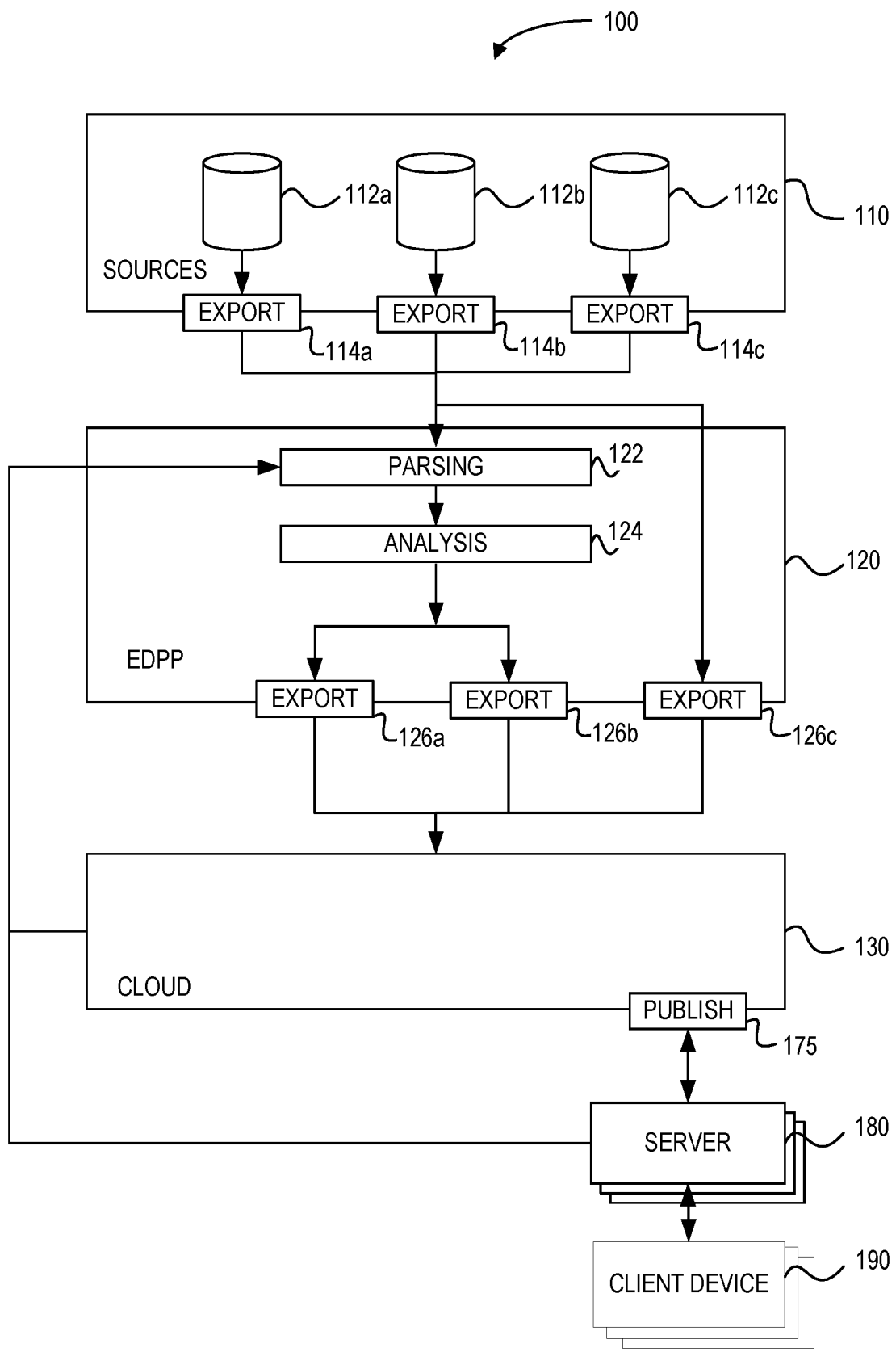
FIG. 1A is a schematic block diagram of a system for processing fraudulent data from different data sources in accordance with at least some embodiments.

False data entities (also herein called "malicious actors") may use phony or fraudulent data (e.g., name, mailing address, phone number, email address, income, assets, credit card number, employer, etc.) to carry out malicious acts, such as committing fraud against different entities, including government entities, banking entities, and third-party entities. Variants of data may be provided. For example, a malicious actor uses a first false name, a first false mailing address, a first false phone number, a first false email address, and a first false credit card number with a first entity and their first data system. A few days later, the same malicious actor uses a second false name, a second false mailing address, the first false phone number, the first false email address, and a second false credit card number with a second entity and their second data system. Tracking and identifying the malicious actor can be difficult because of the disparate data systems and the differences in the data provided by the malicious actor. Even in cases where the first data system identifies the malicious actor has provided false data and that the second data system identifies the malicious actor has provided false data, the first data system and the second data system may each consider the malicious actor to be two separate entities due to the different information provided.

In some cases, data systems that track false data entities, which may be malicious actors, are updated live (e.g., in near real time once a malicious actor has been identified). In some cases, data systems that track false data entities, which may be malicious actors, are updated daily. In some cases, data systems that track false data entities, which may be malicious actors, are updated on an ad hoc basis. It will be appreciated that different data systems may update their data regarding false data entities (including potential or actual malicious actors) at different times.

In some cases, data systems that track false data entities, which may be malicious actors, provide data using different schema or different data structures, or both. In some cases, data systems provide lists. In some cases, data systems are accessible via an application programming interface (API). It will be appreciated that different data systems may provide their data in different ways.

The differences between data systems makes it more difficult to track data, consolidate data, and identify a malicious actor. Existing computing systems have difficulty to adapt to these differences.

In some cases, a Data-as-a-Service tool is provided that ingests data about false data entities from different data sources on a daily basis, processes the data files to generate data entries with a common data structure that can be consolidated or merged into a single consolidated list of false data entities, compares to previous lists to obtain a delta, and then updates a global watchlist.

In some cases, a centralized computing tool is provided to generate and manage a consolidated malicious actor list (global list of persons or entities who have committed fraud).

In some cases, the tool ingests updated data from data sources including commercial data systems provided under the trade names Threatmetrix™, CROMS™, LexisNexis™, AutoPlus™, and TransUnion™. Data from other external data sources and internal data sources can be ingested and used by the tool.

In some cases, the tool provides regular updates to databases that support a daily batch model (e.g., within 24 h), related tools (e.g., applications), and reporting.

In some cases, the tool helps fraud investigation teams to search and view information regarding the malicious actors who are associated with their investigation. The tool is based on Data-as-a-Service (DaaS), and includes modules for data ingestion from multiple data sources, data reporting including automatically building and updating a watchlist of malicious actors, and a module for analysing the data about the malicious actors.

In some cases, on a daily basis, the tool ingests data about malicious actors from different data sources. The forms of data sources include apps, users, and analytics platforms. Data connections made in the backend feed into a data pipeline in the tool, and the data from the different data sources is merged or consolidated into a consolidated list of malicious actors. In some cases, the consolidated list has several million rows of malicious actors. Each row, for example, is a different combination of information values, including name, phone number, address, etc.

In some cases, one or more data sources provide multiple data file dumps within a day. The tool preprocesses these multiple data file dumps to deduplicate common data entries.

In some cases, on a daily basis, the tool obtains snapshots of data from different data sources, merges the data, and then obtains deltas in the information. The deltas in the information are used to update the consolidate list of malicious actors.

In some cases, the data source identity is stored in association with a given entry of a malicious actor. Different data sources can have different risk profiles. It is also appreciated that different data sources can bring in different malicious actors to the consolidated list.

In some cases, the tool has a front-end GUI that allows a user to quickly search the consolidated list, as well as to edit or add data to the consolidated list.

In some cases, one or more analytics modules are provided to access the consolidated list, for example, to record and report on the number of views associated with different data sources.

In some cases, data sources ingested into the tool may be used for claims fraud detection or underwriting fraud detection.

In some cases, the tool is used for investigation and detection. New watchlist indicators are built into a Case Management Tool (CMT) for the fraud investigation team.

In some cases, a Flag Abnormal Risk Entities (FLARE) model is used for underwriting fraud detection which predicts if a new policy has a high risk for fraud that requires further investigation.

In some cases, ingesting data from different sources is non-trivial. For instance, some external data sources may not offer historical data, while others may use different schemas or naming conventions. Furthermore, there may be mismatches in real time control information received from the external data sources. The tool obtains control information to reconcile data from external data systems with existing data, and preprocesses to adjust raw data so that record counts are correct.

In some cases, whenever there are updates, the computing system can re-run the data acquisition job and send back updates to the tool. These updates are herein referred to as "micro updates".

Referring now to FIG. 1A, there is illustrated a block diagram of an example computing system, in accordance with at least some embodiments. Computing system 100 includes external data sources 110, an enterprise data provisioning platform (EDPP) 120 operatively coupled to external data sources 110, and a cloud-based computing cluster 130 that is operatively coupled to the EDPP 120. A server system 180 is operatively coupled to the cloud-based computing cluster 130. In some cases. this computing system 100 is provided for automated data processing of large data sets, including computing data regarding false data entities from different data source.

The external data sources 110 include multiple data source systems that each include one or more databases, of which three are shown for illustrative purposes: database 112a, database 112b and database 112c. One or more of the databases of the external data sources 110 may contain confidential information that is subject to restrictions on export. One or more export modules 114a, 114b, 114c may periodically (e.g., daily, weekly, monthly, etc.) export data from the databases 112a, 112b, 112c to EDPP 120. In some instances, the data is exported on an ad hoc basis.

EDPP 120 receives source data exported by the export modules 114 of databases 112 corresponding to external data sources 110, processes it and exports the processed data to an application database within the cluster 130. For example, a parsing module 122 of EDPP 120 may perform extract, transform and load (ETL) operations on the received source data.

In many environments, access to the EDPP may be restricted to relatively few users, such as administrative users. However, with appropriate access permissions, data relevant to an application or group of applications (e.g., including software tools) may be exported via reporting and analysis module 124 or an export module 126. In particular, parsed data can then be processed and transmitted to the cloud-based computing cluster 130 by a reporting and analysis module 124. Alternatively, one or more export modules 126 can export the parsed data to the cloud-based computing cluster 130.

In some cases, there may be confidentiality and privacy restrictions imposed by governmental, regulatory, or other entities on the use or distribution of the source data. These restrictions may prohibit confidential data from being transmitted to computing systems that are not "on-premises" or within the exclusive control of an organization, for example, or that are shared among multiple organizations, as is common in a cloud-based environment. In particular, such privacy restrictions may prohibit the confidential data from being transmitted to distributed or cloud-based computing systems, where it can be processed by machine learning systems, without appropriate anonymization or obfuscation of PII in the confidential data. Moreover, such "on-premises" systems typically are designed with access controls to limit access to the data, and thus may not be resourced or otherwise suitable for use in broader dissemination of the data. To comply with such restrictions, one or more module of EDPP 120 may "de-risk" data tables that contain confidential data prior to transmission to cluster 130. This derisking process may, for example, obfuscate or mask elements of confidential data, or may exclude certain elements, depending on the specific restrictions applicable to the confidential data. The specific type of obfuscation, masking or other processing is referred to as a "data treatment."

The server system 180 may be part of the cloud-based computing cluster 130 or may be a separate system. The server system 180 hosts a global database for false data entities and a false data entities application that is accessible one or more client devices 190. For example, the client devices include one or more of laptops, desktop computers, and mobile devices.

In some cases, data produced from the cloud-based computing cluster 130 or the server system 180, or both, is fed back to the EDPP 120 and is parsed using the parsing module 122. For example, data about viewers viewing the published data (e.g., herein generally called "viewing data") is fed back to the parsing module 122. In some cases, analytics data that is computed by the cloud-based computing cluster 130 is fed back to the parsing module 122. It will be appreciated that other types of data could be fed back to the parsing module 122.

Figure 1B:
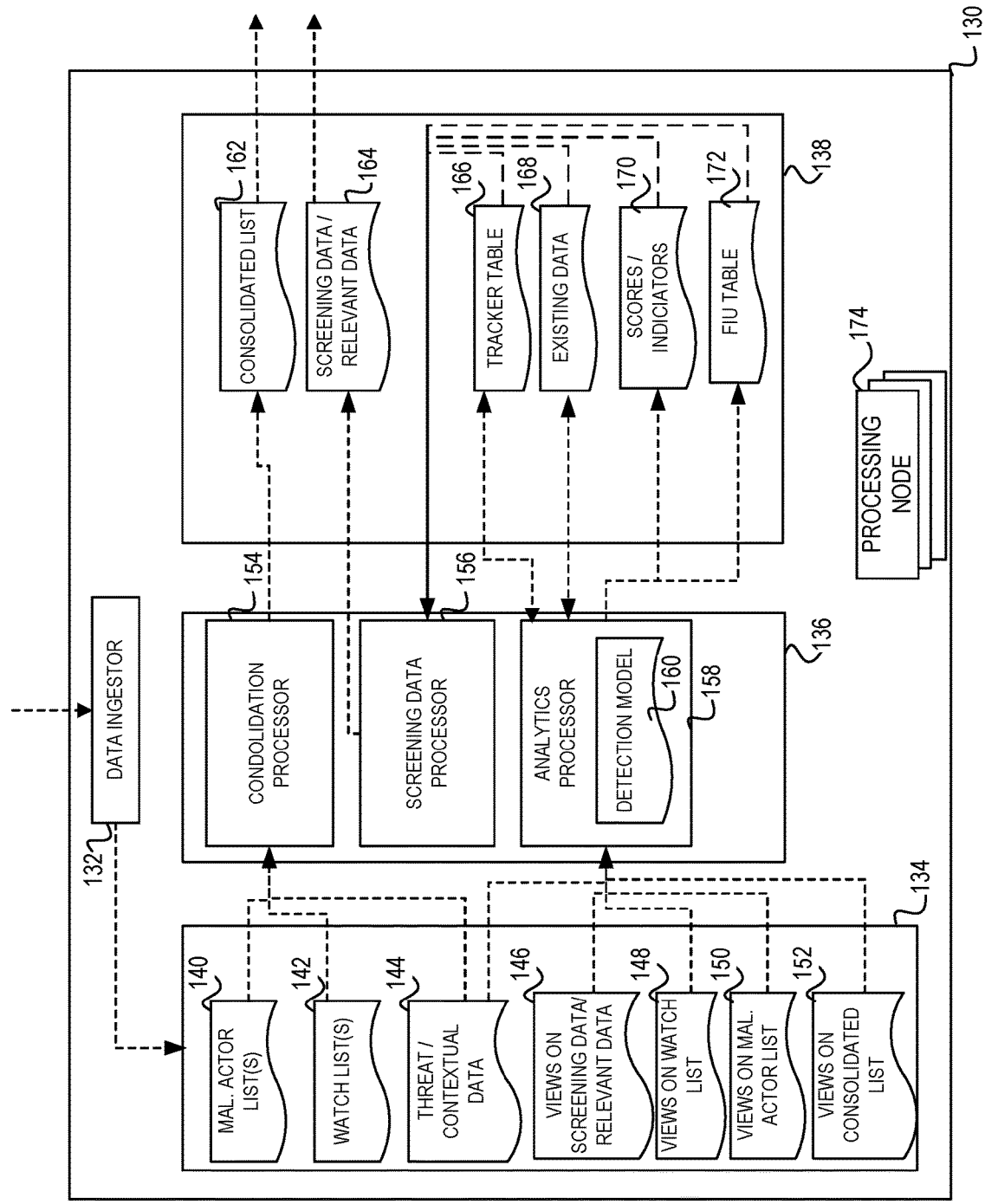
FIG. 1B is a schematic block diagram of a cloud computing platform of FIG. 1A for computing a consolidated list of false data entities in accordance with at least some embodiments.

Referring now to FIG. 1B, there is illustrated a block diagram of the cloud-based computing cluster 130, showing greater detail of the elements of the cluster, which may be implemented by computing nodes of the cluster that are operatively coupled.

The components of the cloud-based computing cluster 130 include a data ingestor 132 and a centralized tool 136 that could be implemented as a DAAS. The centralized tool 136 includes a consolidation processor 154, a screening data processor 156, an analytics processor 158. The analytics processor 158 includes a detection model 160 that is trained to detect false activity.

These processors (also herein called "modules") in the centralized tool 136 are implemented as one or more processing nodes 174 in the computing cluster. Similarly, the data ingestor 132 is implemented as one or more processing nodes 174 in the computing cluster. In some cases, the consolidation processor 154, the screening data processor 156, the analytics processor 158 are each implemented as a virtual machine within the cloud-based computing cluster 130.

The cloud-based computing cluster 130 also includes one or more file systems or data stores 134 and 138 for storing ingested data and compute data for identifying false data entities. In some cases, the file systems 134 and 138 are combined into a single file system. In some cases, the file systems 134, and 138 are a distributed file system such as the Hadoop Distributed File System (HDFS). HDFS can be used to implement one or more application database 139, each of which may contain one or more tables, and which may be partitioned temporally or otherwise.

Within the cloud-based computing cluster 130, multiple data files are ingested using the data ingestor 132 from multiple external data sources, such as databases 112*a*, 112*b*, 112*c*. The ingested data files include one or more malicious actor lists 140, one or more watch lists 142, and one or more data files 144 containing threat data or contextual data, or both.

The ingested data files also include data about views of screening data or relevant data (or both) 146, data about views of the one or more watch lists 148, data about views of the one or more malicious actor lists 150, and data about views of the consolidated list 152. This data is herein called "viewing data".

The one or more malicious actor lists 140, one or more watch lists 142, and one or more data files 144 containing threat data or contextual data, or both, are processed by the consolidation processor 154, which consolidates this data into a consolidated list 162.

The one or more data files 144 containing threat data or contextual data, or both, and the viewing data (146, 148, 150, 152) are obtained by the analytics processor 158 and are used to compute analytics data for a tracker table 166, an existing data store 168, a score or indicators table 170, and a false investigation team (FIU) table 172. In some cases, the data in the tracker table 166 and the existing data store 168 are fed back to the analytics processor 158 for future iterations of computing analytics data.

In some cases, the data from one or more of the tracker table 166, the existing data store 168, the score or indicators table 170 and the FIU table 172 are obtained by the screening data processor 156 and are used to computing screening data or relevant data 164.

Figure 1C:
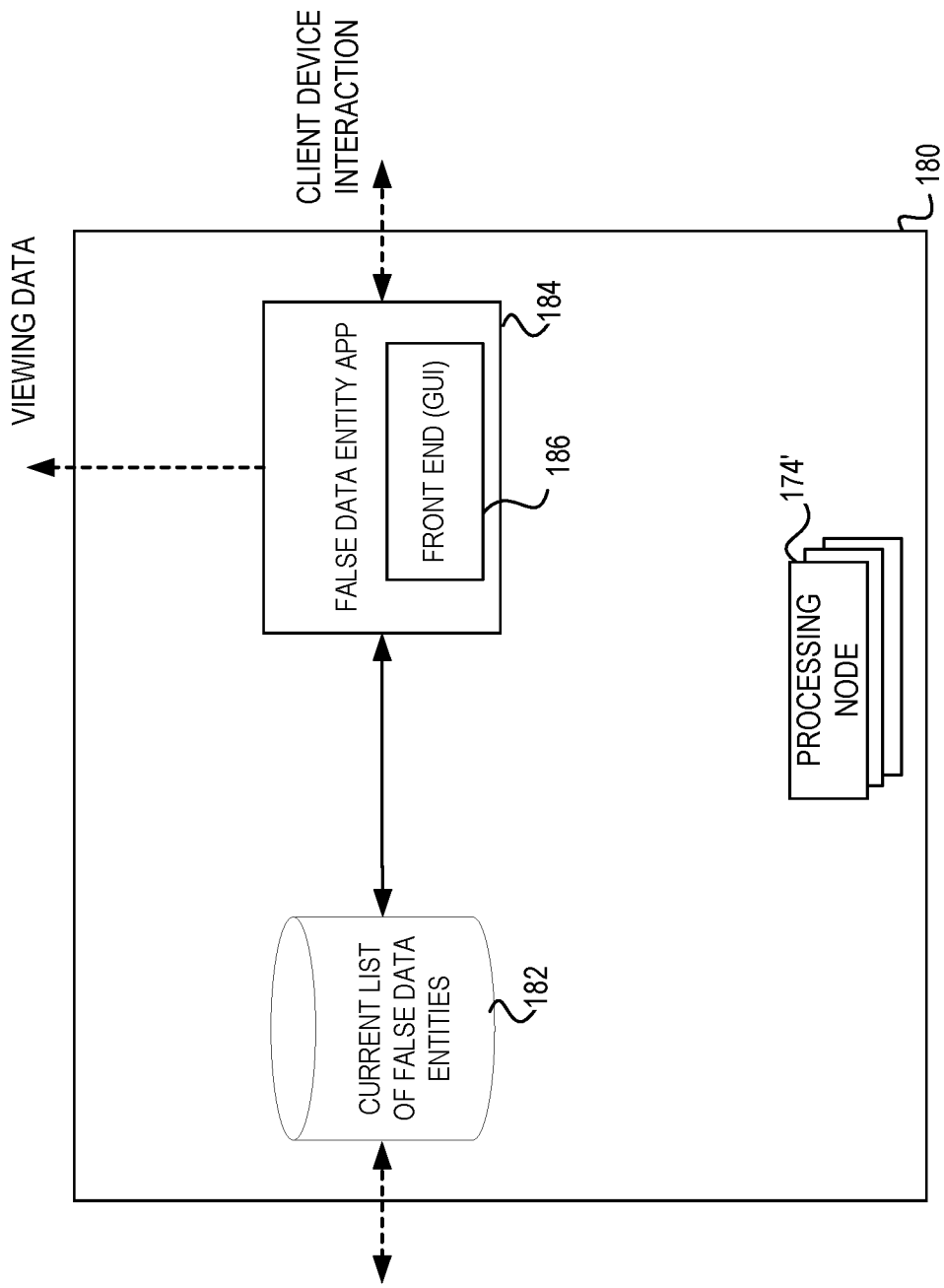
FIG. 1C is a schematic block diagram of a server node of FIG. 1A for storing a global list of false data entities and hosting an application for accessing the same in accordance with at least some embodiments.

The consolidated list 162 and the screening data or relevant data 164 are published to the server system 180, and in some cases, to a database 182 storing a current list of false data entities, as shown in FIG. 1C.

In some cases, there are a sequence of instances of the consolidated list 162 that correspond to a sequence of time periods. A consolidated list corresponding to a current time period is used to update the database 182.

In some cases, the cloud-based computing cluster 130 ingests data related to views of the consolidated list 152 and the threat data and a contextual data 144, and using the analytics processor 158 processes this data to generate analytics data (e.g., the tracker table 166, the existing data store 168, the score or indicators table 170 and the FIU table 172). The data related to views comprises viewing data regarding one or more users viewing the consolidated list via the GUI.

This analytics data is processed by the screening data processor 156 to generate a screening data file, which includes the screening data or relevant data 164. In some cases, this data is stored in the database 182, and the GUI 186 displays a screening data entry from the screening data file.

Referring to FIG. 1C, an example of a server system 180 includes the database 182 storing a current list of false data entities, which is accessible by a false data entity application 186. The false data entity application 184 is configured to perform CRUD (create, read, update, delete) operations on the database 182. The false data entity application 184 includes a front end GUI 186 which can be displayed in a web browser or a dedicated app on one or more client devices 190. As user of the false data entity application 184 view different data, including the consolidated list, the false data entity application 184 collects viewing data and provides the viewing data to the EDPP for parsing and processing.

The false data entity application 184 can be implemented as one or more processing nodes 174' or as a virtual machine.

In some other cases, the database 182 and the false data entity application 186 are part of the cloud-based computing cluster 130.

Referring back to FIG. 1B, in some cases a data pipeline is implemented that includes the consolidation processor 154 and the screening data processor 156, including their data inputs and data outputs.

Figure 2:
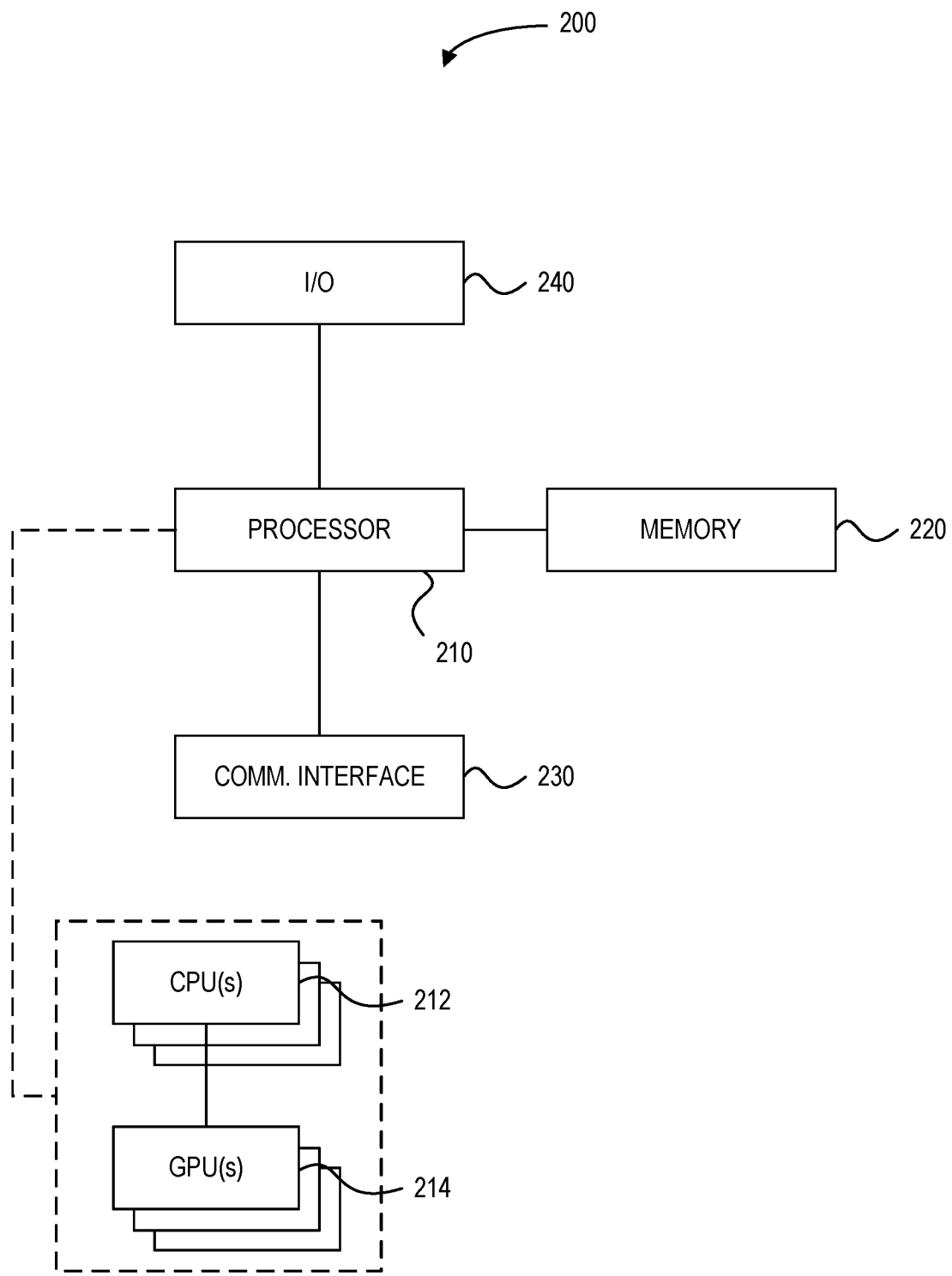
FIG. 2 is a block diagram of a computer in accordance with at least some embodiments.

Referring now to FIG. 2, there is illustrated a simplified block diagram of a computer in accordance with at least some embodiments. Computer 200 is an example implementation of a computer such as external data sources 110, EDPP 120, processing node 174 and 174' of FIG. 1. Computer 200 has at least one processor 210 operatively coupled to at least one memory 220, at least one communications interface 230 (also herein called a network interface), and at least one input/output device 240.

The at least one memory 220 includes a volatile memory that stores instructions executed or executable by processor 210, and input and output data used or generated during execution of the instructions. Memory 220 may also include non-volatile memory used to store input and/or output data—e.g., within a database-along with program code containing executable instructions.

Processor 210 may transmit or receive data via communications interface 230, and may also transmit or receive data via any additional input/output device 240 as appropriate.

In some cases, the processor 210 includes a system of central processing units (CPUs) 212. In some other cases, the processor includes a system of one or more CPUs and one or more Graphical Processing Units (GPUs) 214 that are coupled together.

Figure 3:
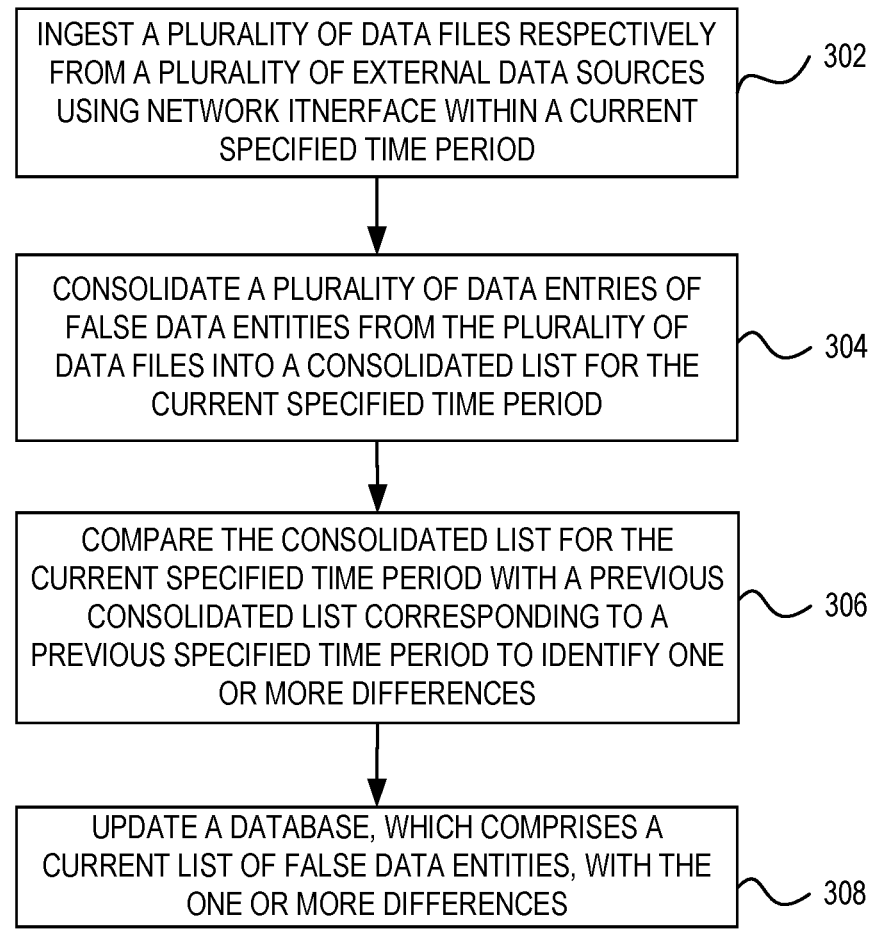
FIG. 3 is a flowchart diagram of an example method of detecting false data entities in accordance with at least some embodiments.

Referring now to FIG. 3, an example computer implemented method is provided for identifying false data entities.

Block 302: A computing system ingests a plurality of data files respectively from a plurality of external data sources using a network interface within a current specified time period.

Block 304: The computing system consolidates a plurality of data entries of false data entities from the plurality of data files into a consolidated list for the current specified time period.

Block 306: The computing system compares the consolidated list for the current specified time period with a previous consolidated list corresponding to a previous specified time period to identify one or more differences.

Block 308: The computing system then updates a database, which comprises a current list of false data entities, with the one or more differences.

Figure 4A:
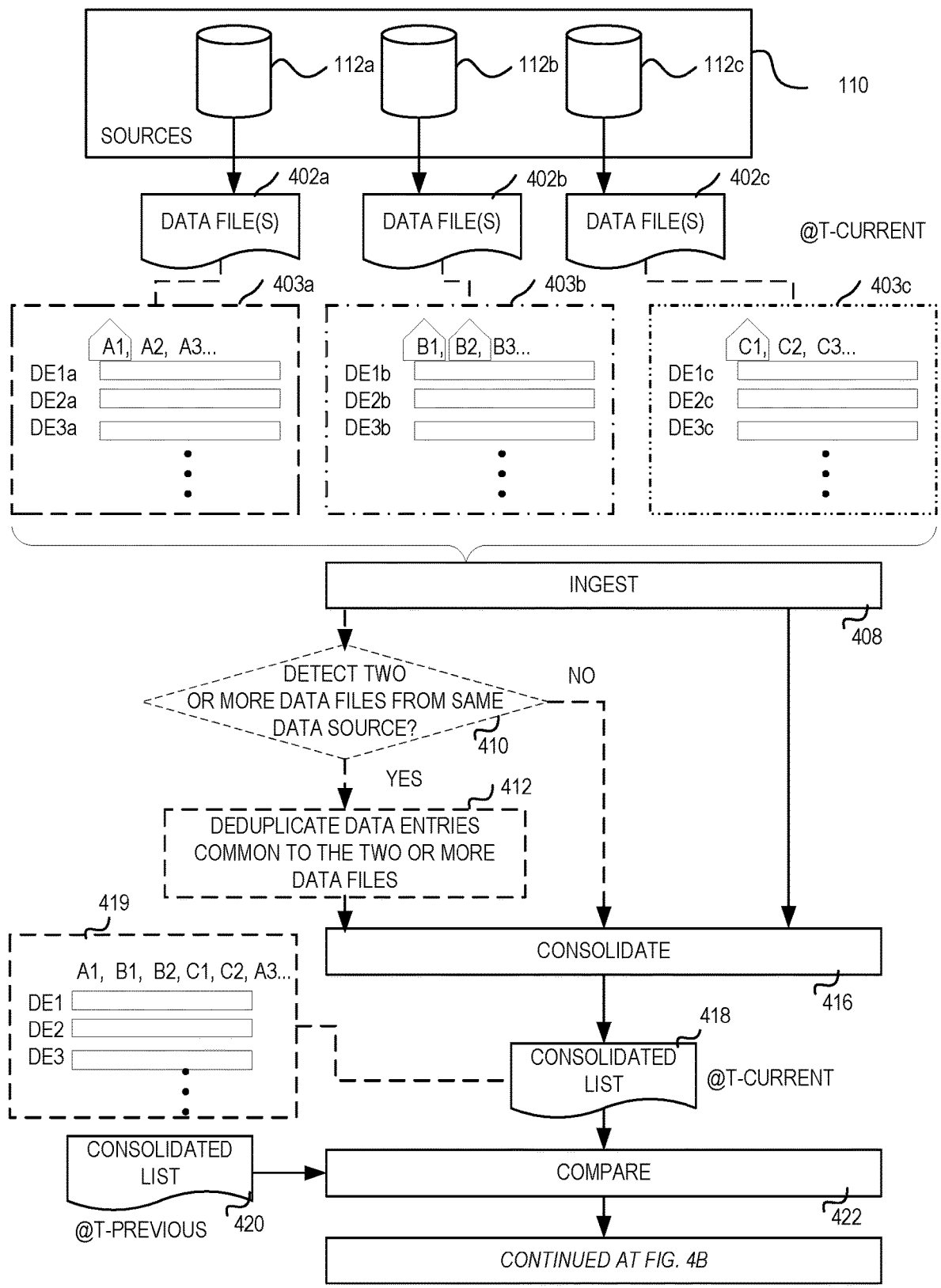
FIGS. 4A and 4B is a flowchart diagram of another example method of detecting false data entities, including showing data components, in accordance with at least some embodiments.
Figure 4B:
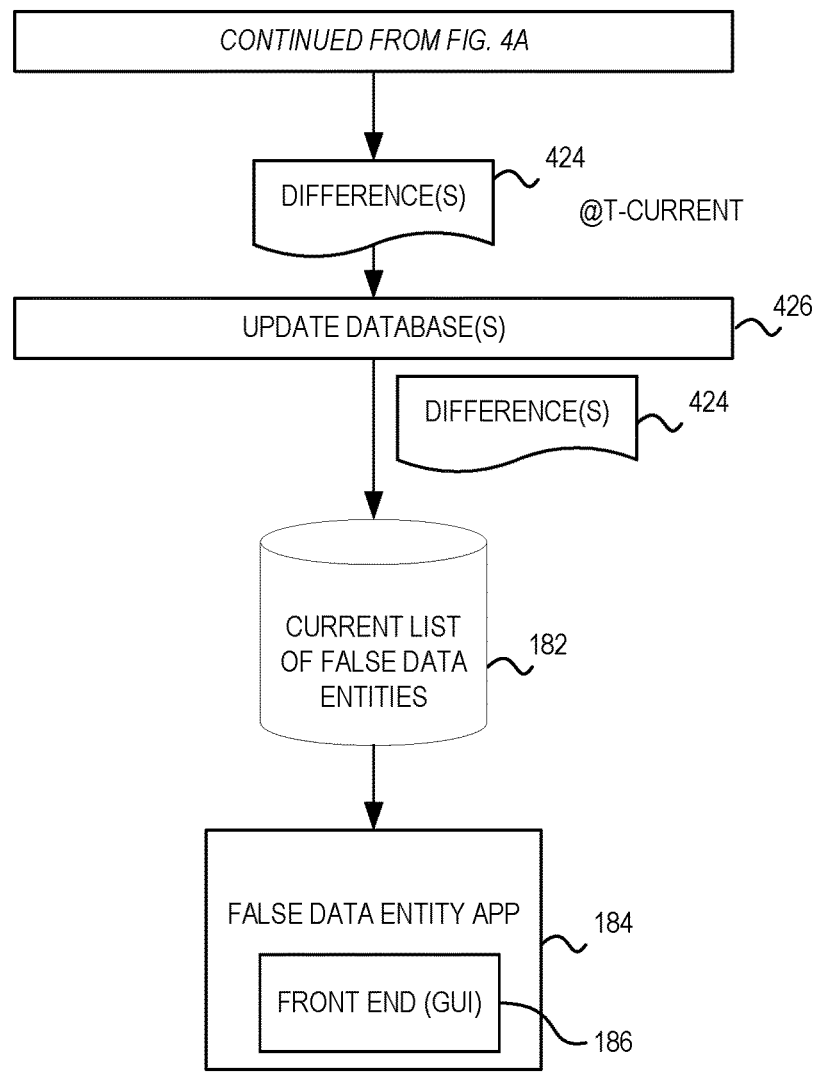

Referring now to FIGS. 4A and 4B, another example method is provided.

A plurality of data files 402a, 402b, 402c are provided respectively from a plurality of external data sources 110, and more specifically the databases 112a, 112b, 112c, and undergo an ingestion process 408 using a network interface 230 within a current specified time period (e.g., @T-current). In some cases, the data files 402a, 402b, 402c are one or more malicious actor lists 140, one or more watch lists 142, and one or more data files 144 containing threat data or contextual data, or both. Although three databases are shown, it will be appreciated that the data files may originate from more than three external data sources, or less than three external data sources.

In some cases, each data file includes a plurality of data entries of false data entities. In this example, the data file 402a includes a data structure 403a that includes data entries (e.g., DE1a, DE2a, DE3a, etc.) of false data entities and different types of data associated with each data entry (e.g., data types A1, A2, A3, etc.). Each data file as a unique primary key. In this illustrative case for the data file 402a, the unique primary key is A1. The data in the data entries is considered raw data.

Similarly, the data file 402b includes a data structure 403b that includes data entries (e.g., DE1b, DE2b, DE3b, etc.) of false data entities and different types of data associated with each data entry (e.g., data types B1, B2, B3, etc.). In this illustrative case for the data file 402b, the unique primary key is the combination of B1 and B2.

Similarly, the data file 402c includes a data structure 403c that includes data entries (e.g., DE1c, DE2c, DE3c, etc.) of false data entities and different types of data associated with each data entry (e.g., data types C1, C2, C3, etc.). In this illustrative case for the data file 402c, the unique primary key is C1.

In some cases, at least one of the data structures 403a, 403b, 403c is different from the other data structures.

In some cases, the data types are fields of data within the data entries. Examples include a policy number, a name, a claim number, a bank, a company or employer name, a phone number, and an email address. The data types in one data file from a first data source may overlap with one or more data types in another data file from a different and second data source. In an example scenario, data files from a first data source designate a policy number as a primary key; data files from a second data source designate a combination of a claim number and a name as the primary key; and data files from a third data source designate an account number as the primary key.

After the data is ingested, in some cases, the computing system executes a consolidation process 416 to consolidate a plurality of data entries of false data entities from the plurality of data files into a consolidated list 418 for the current specified time period (e.g., @T-current).

In some cases, the plurality of data files 402a, 402b, 402c respectively have a plurality of different data structures 403a, 403b, 403c, and the processor 210 of the computing system is further configured to process the plurality of data files 402a, 402b, 402c to generate the plurality of data entries (e.g., DE1, DE2, DE3, etc.) with a common data structure 419 for consolidation in the consolidated list 418 for the current specified time period (e.g., @T-current). In some cases, the common data structure includes the unique primary key from each of the plurality of data files. In this example scenario, the data types A1, B1, B2, are C1 included in the common data structure 419. Additional data types can also be included in the common data structure 419.

In some cases, the computing system detects if a given one of the plurality of external data sources provides at least two data files within the current specified period (block 410). If so, the computing system is configured to pre-process raw data from the at least two data files to deduplicate one or more data entries common to the at least two data files (block 412). After the data is entries are deduplicated, the at least two data files undergo the consolidation process 416, along with any other data files. In some cases, this deduplication is useful when a given external data source outputs multiple data files (e.g., watch lists, malicious actor lists, etc.) several times within a same day, and the computing system only consolidates the data files once a day (e.g., a daily basis).

In some cases, the consolidation process 416 includes the computing system (e.g., its processor) identifying a set of different data entries, comprising a given data entry from each of the plurality of data files, with matching contact information of a given false data entity. The set of different data entries are then merged into a single entry for the given false data entity in the consolidated list.

In an example scenario, a malicious actor uses a first false name, a first false mailing address, a first false phone number, a first false email address, and a first false credit card number, which is captured in a first external data source that provides this information as a data entry in a data file 402a. The same malicious actor uses a second false name, a second false mailing address, the first false phone number, the first false email address, and a second false credit card number, which is captured in a second external data source that provides this information as a data entry in a data file 402b. The computing system identifies that the first false phone number and the first false email address (e.g., contact information) are matching between the two data entries from the different data files 402a, 402b. These two data entries are then merged into a single entry for the malicious actor in the consolidate list 418. The computing system, for example, generates a new row representing a new data entry based on the merged data.

After obtaining the consolidated list 418, the computing system compares the consolidated list 418 for the current specified time period (e.g., @T-current) with a previous consolidated list 420 corresponding to a previous specified time period (e.g., @T-previous) to identify one or more differences 424.

In some cases, the time period is one day. Therefore, the current specified time period is today, and the previous specified time period is yesterday. In an example aspect, the previous specified time period is the time period that immediately precedes the current time period.

In some cases, the computing system then executes an update process 426 to update a database 182, which includes a current list of false data entities, with the one or more differences 424. The updated database 182 is accessed and viewed using the false data entity application 184.

Figure 5:
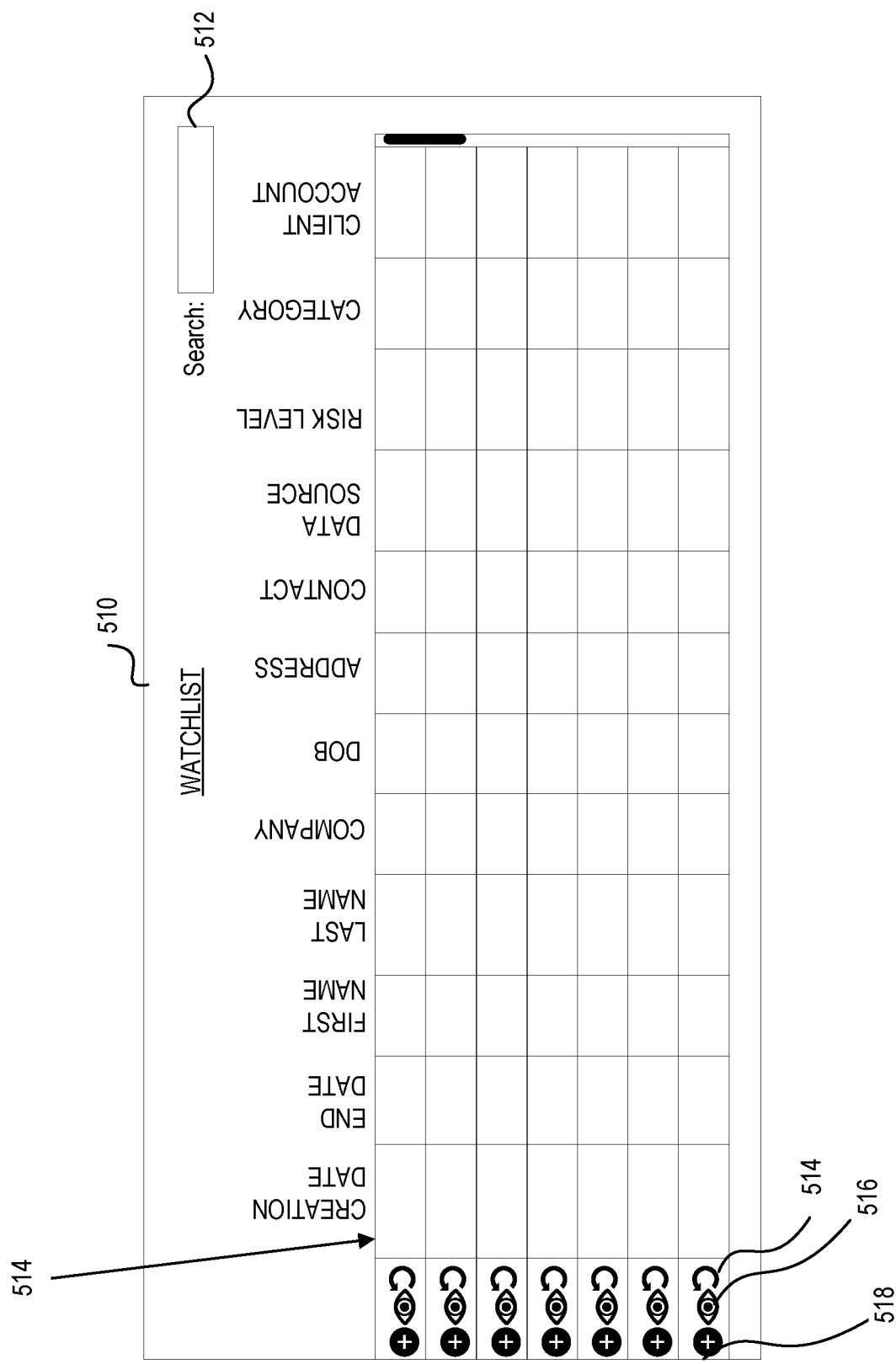
FIG. 5 is a schematic diagram of an example graphical user interface (GUI) of a false data entity application in accordance with at least some embodiments.

Turning to FIG. 5, an example of the GUI 186 is shown in the rendering 510. This is displayed, for example, on a display screen of a client device 190.

The GUI is configured to display one or more of information values for a given false data entity (e.g., which is shown as a data entry row). The one or more information values comprising one or more of: a creation date, an end date, a name, a date of birth, a phone number, an email address, a data source associated with the entry, and a risk level. Other data that may be rendered in the GUI includes a category and a client account. It will be appreciated that the GUI 186 accesses and displays data from the database 182.

A user can interact with GUI to update data in the database 182. In some cases, the GUI receives a user input to make an addition or an edit to the one or more information values for a given false data entity. The GUI, via the false data entity application 184, propagates the addition or the edit to the current list of false data entities stored in the database 182.

In some cases, one or more search fields 512 are provided to search for a given data entry in the current list of false data entities.

In some cases, a table 514 shows rows of data entries. In this case, each data entry shown in the rendered GUI includes three GUI controls: add details button 514, view details button 516, and view history button 518.

In some cases, when the user views the GUI showing the table 514, the false data entity application 184 records the viewing information for the consolidated list and sends data regarding the views on consolidated list 152 to the parsing module 122, which is pre-processed and fed back to the centralized tool 136.

In some cases, the GUI also displays screening data or relevant data 164, the one or more watch lists 142, and the one or more malicious actor lists 140. The viewing data related to these other types of data is also recorded and fed back to the parsing module 122, which are pre-processed and fed back to the centralized tool 136.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g., 112a, or 112*b*). All elements with a common base number may be referred to collectively or generically using the base number without a suffix (e.g., 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g., a pushbutton keyboard, mouse, a touchscreen, and the like), and at least one output device (e.g., a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. A server system for detecting false data entities, the server system comprising:
a memory, a network interface, and a processor, the processor operably coupled to the memory and the network interface;
the processor configured to:
provide, in a data pipeline, a plurality of data connections to a plurality of external data sources;
ingest, using the plurality of data connections, a plurality of data files respectively from the plurality of external data sources within a current specified time period;
consolidate a plurality of data entries of false data entities from the plurality of data files into a consolidated list for the current specified time period;
compare the consolidated list for the current specified time period with a previous consolidated list corresponding to a previous specified time period to identify one or more differences;
update a database, which comprises a current list of false data entities, with the one or more differences; and
access the database and display, using a graphical user interface (GUI), the one or more of differences in association with a given false data entity.

2. The server system of claim 1, wherein a given one of the plurality sources provides at least two data files within the current specified period, and the processor is configured to pre-process raw data from the at least two data files to deduplicate one or more data entries common to the at least two data files.

3. The server system of claim 1, wherein each of the plurality of data files respectively from the plurality of data sources comprise a unique primary key, and the unique primary key from each of the plurality of data files is represented in the consolidated list.

4. The server system of claim 3, wherein the plurality of data files respectively have a plurality of different data structures, and the processor is further configured to process the plurality of data files to generate the plurality of data entries with a common data structure for consolidation in the consolidated list for the current specified time period, the common data structure including the unique primary key from each of the plurality of data files.

5. The server system of claim 1, wherein the processor is configured to further:
identify a set of different data entries, comprising a given data entry from each of the plurality of data files, with matching contact information of the given false data entity; and
merge the set of different data entries into a single entry for the given false data entity in the consolidated list.

6. The server system of claim 1, wherein the GUI is configured to display a creation date, an end date, a name, a date of birth, a phone number, an email address, a data source associated with the entry, or a risk level, or a combination thereof, in association with the given false entity.

7. The server system of claim 6, wherein the processor is configured to further receive a user input via the GUI an addition or an edit to one or more information values for the given false data entity, and to propagate the addition or the edit to the current list of false data entities stored in the database.

8. The server system of claim 6, wherein the processor is configured to further: ingest a data related to views of the consolidated list and, one or both of, a threat data and a contextual data; and process the data related to views on the consolidated list and, one or both of the threat data and the contextual data to generate an analytics data; and wherein the data related to views comprises viewing data regarding one or more users viewing the consolidated list via the GUI.

9. The server system of claim 8, wherein the processor is configured to further: process the analytics data to generate a screening data file; and store the screening data file in the database; and, wherein the GUI is configured to display a screening data entry from the screening data file.

10. The server system of claim 1, wherein the processor is configured to further execute an ingestion process, a consolidation process, a comparison process, and an update process each day; and, wherein the current specified time period is today and the previous specified time period is yesterday.

11. A method for detecting false data entities, the method executed in a computing environment comprising one or more processors and memory, the method comprising:
providing, in a data pipeline, a plurality of data connections to a plurality of external data sources;
ingesting, using the plurality of data connections, a plurality of data files respectively from the plurality of external data sources using a network interface within a current specified time period;
consolidating a plurality of data entries of false data entities from the plurality of data files into a consolidated list for the current specified time period;
comparing the consolidated list for the current specified time period with a previous consolidated list corresponding to a previous specified time period to identify one or more differences;
updating a database, which comprises a current list of false data entities, with the one or more differences; and
accessing the database and displaying, using a graphical user interface (GUI), the one or more of differences in association with a given false data entity.

12. The method of claim 11, wherein a given one of the plurality sources provides at least two data files within the current specified period, and the processor is configured to pre-process raw data from the at least two data files to deduplicate one or more data entries common to the at least two data files.

13. The method of claim 11, wherein each of the plurality of data files respectively from the plurality of data sources comprise a unique primary key, and the unique primary key from each of the plurality of data files is represented in the consolidated list.

14. The method of claim 13, wherein the plurality of data files respectively have a plurality of different data structures, and the processor is further configured to process the plurality of data files to generate the plurality of data entries with a common data structure for consolidation in the consolidated list for the current specified time period, the common data structure including the unique primary key from each of the plurality of data files.

15. The method of claim 11, further comprising:
identifying a set of different data entries, comprising a given data entry from each of the plurality of data files, with matching contact information of a given false data entity; and
merging the set of different data entries into a single entry for the given false data entity in the consolidated list.

16. The method of claim 11, wherein the GUI is configured to display a creation date, an end date, a name, a date of birth, a phone number, an email address, a data source associated with the entry, or a risk level, or a combination thereof.

17. The method of claim 16, further comprising receiving a user input via the GUI an addition or an edit the one or more information values for the given false data entity, and propagating the addition or the edit to the current list of false data entities stored in the database.

18. The method of claim 16, further comprising: ingesting a data related to views of the consolidated list and, one or both of, a threat data and a contextual data; and processing the data related to views on the consolidated list and one or both of the threat data and the contextual data to generate an analytics data; and wherein the data related to view comprises viewing data regarding one or more users viewing the consolidated list via the GUI.

19. The method of claim 11, further comprising executing the ingesting, the consolidating, the comparing, and the updating each day; and, wherein the current specified time period is today and the previous specified time period is yesterday.

20. A non-transitory computer readable medium storing computer executable instructions which, when executed by at least one computer processor, cause the at least one computer processor to carry out a method for detecting false data entities, the method comprising:
providing, in a data pipeline, a plurality of data connections to a plurality of external data sources;
ingesting, using the plurality of data connections, a plurality of data files respectively from the plurality of external data sources using a network interface within a current specified time period;
consolidating a plurality of data entries of false data entities from the plurality of data files into a consolidated list for the current specified time period;
comparing the consolidated list for the current specified time period with a previous consolidated list corresponding to a previous specified time period to identify one or more differences;
updating a database, which comprises a current list of false data entities, with the one or more differences; and
accessing the database and displaying, using a graphical user interface (GUI), the one or more of differences in association with a given false data entity.

* * * * *